(12) United States Patent
Paripally et al.

(10) Patent No.: US 11,756,406 B2
(45) Date of Patent: Sep. 12, 2023

(54) SYSTEMS AND METHODS FOR PROVIDING EVACUATION MONITORING AND ASSISTANCE

(71) Applicant: Johnson Controls Tyco IP Holdings LLP, Milwaukee, WI (US)

(72) Inventors: Gopal Paripally, North Andover, MA (US); Jason M. Ouellette, Sterling, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 191 days.

(21) Appl. No.: 17/368,530

(22) Filed: Jul. 6, 2021

(65) Prior Publication Data

US 2023/0009081 A1 Jan. 12, 2023

(51) Int. Cl.
*G08B 21/22* (2006.01)
*H04W 4/029* (2018.01)
(Continued)

(52) U.S. Cl.
CPC ............. *G08B 21/22* (2013.01); *G06F 18/22* (2023.01); *G06K 7/1413* (2013.01); *G06V 20/00* (2022.01);
(Continued)

(58) Field of Classification Search
CPC ......... H04W 4/023; H04W 4/90; H04W 4/02; H04W 4/024; H04W 4/026; H04W 4/021; H04W 4/33; H04W 4/38; H04W 4/029; G01S 19/01; G01S 1/02; G08B 21/22; G08B 21/182; G06V 40/10; G06V 20/00; G06F 18/22; G06K 7/1413
See application file for complete search history.

(56) References Cited

U.S. PATENT DOCUMENTS 9,860,723 B2 * 1/2018 R ............................ H04W 4/90
2012/0276517 A1 * 11/2012 Banaszuk .......... G01C 21/3446
434/365

(Continued)

FOREIGN PATENT DOCUMENTS

| CN | 102509410 A | | 6/2012 | |
|---|---|---|---|---|
| CN | 109816319 A | * | 5/2019 | |
| EP | 2883376 B1 | * | 3/2020 | ............ H04W 4/021 |

*Primary Examiner* — Dung Hong
(74) *Attorney, Agent, or Firm* — ArentFox Schiff LLP

(57) ABSTRACT

Disclosed herein are apparatuses and methods for providing evacuation guidance. An implementation may comprise identifying a person physically present in an environment requiring an evacuation. The implementation further includes detecting, using at least one sensor in the environment, a last known location of the person. The implementation further includes calculating an exit time for evacuating the environment based on the last known location. The implementation further includes monitoring, using at least one sensor located at an egress point of the environment, whether the person has evacuated the environment. The implementation further includes determining whether a current time has passed the exit time. The implementation further includes transmitting an alert to a device of the respective person in response to determining that the current time has passed the exit time and that the person has not evacuated the environment.

20 Claims, 6 Drawing Sheets

(51) Int. Cl.
    *G06V 40/10*     (2022.01)
    *G06V 20/00*     (2022.01)
    *G06F 18/22*     (2023.01)
    *G06K 7/14*     (2006.01)
    *G08B 21/18*     (2006.01)

(52) U.S. Cl.
    CPC .......... *G06V 40/10* (2022.01); *G08B 21/182* (2013.01); *H04W 4/029* (2018.02)

(56) References Cited

U.S. PATENT DOCUMENTS

| | | | |
|---|---|---|---|
| 2019/0020978 A1* | 1/2019 | Finschi | G01C 21/206 |
| 2019/0139339 A1* | 5/2019 | Garthe | H04L 65/102 |
| 2019/0172165 A1* | 6/2019 | Verteletskyi | H04L 69/08 |
| 2020/0141734 A1* | 5/2020 | Casarez | G05B 19/042 |

\* cited by examiner

SYSTEMS AND METHODS FOR PROVIDING EVACUATION MONITORING AND ASSISTANCE

TECHNICAL FIELD

The described aspects relate to security systems.

BACKGROUND

Aspects of the present disclosure relate generally to security systems, and more particularly, to providing evacuation guidance (e.g., monitoring and assistance).

Evacuations are stressful situations in which a large group of people need to leave a particular area within a time period. Panic and lack of communication often lead to poorly-executed evacuations in which people are unable to leave the area in time. This may be because of obstacles in the area, physical limitations of a person, the large distance the person needs to cover to evacuate, delays in communication, etc.

Conventional security systems are unable to address these issues. Accordingly, there exists a need for improvements in such security systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for providing evacuation guidance, comprising identifying a person physically present in an environment requiring an evacuation. The method further includes detecting, using at least one sensor in the environment, a last known location of the person. The method further includes calculating an exit time for evacuating the environment based on the last known location. The method further includes monitoring, using at least one sensor located at an egress point of the environment, whether the person has evacuated the environment. The method further includes determining whether a current time has passed the exit time. The method further includes transmitting an alert to a device of the respective person in response to determining that the current time has passed the exit time and that the person has not evacuated the environment.

Another example implementation includes an apparatus for providing evacuation guidance, comprising a memory and a processor communicatively coupled with the memory. The processor is configured to identify a person physically present in an environment requiring an evacuation. The processor is configured to detect, using at least one sensor in the environment, a last known location of the person. The processor is configured to calculate an exit time for evacuating the environment based on the last known location. The processor is configured to monitor, using at least one sensor located at an egress point of the environment, whether the person has evacuated the environment. The processor is configured to determine whether a current time has passed the exit time. The processor is configured to transmit an alert to a device of the respective person in response to determining that the current time has passed the exit time and that the person has not evacuated the environment.

Another example implementation includes an apparatus for providing evacuation guidance. The apparatus further includes means for identifying a person physically present in an environment requiring an evacuation. The apparatus further includes means for detecting, using at least one sensor in the environment, a last known location of the person. The apparatus further includes means for calculating an exit time for evacuating the environment based on the last known location. The apparatus further includes means for monitoring, using at least one sensor located at an egress point of the environment, whether the person has evacuated the environment. The apparatus further includes means for determining whether a current time has passed the exit time. The apparatus further includes means for transmitting an alert to a device of the respective person in response to determining that the current time has passed the exit time and that the person has not evacuated the environment.

Another example implementation includes a computer-readable medium storing instructions for providing evacuation guidance, executable by a processor to identify a person physically present in an environment requiring an evacuation. The instructions are further executable to detect, using at least one sensor in the environment, a last known location of the person. The instructions are further executable to calculate an exit time for evacuating the environment based on the last known location. The instructions are further executable to monitor, using at least one sensor located at an egress point of the environment, whether the person has evacuated the environment. The instructions are further executable to determine whether a current time has passed the exit time. The instructions are further executable to transmit an alert to a device of the respective person in response to determining that the current time has passed the exit time and that the person has not evacuated the environment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

To address one or more shortcomings of conventional security systems, the present disclosure includes apparatuses and methods that provide evacuation guidance. While on one end the people evacuating can benefit from some form of guidance in navigation, first responders such as law enforcement officers, paramedics, EMT's and firefighters can benefit from being provided details in real-time about who has not evacuated and needs help. From a high-level, the present disclosure describes an evacuation guidance component of a computing device that identifies a situation that warrants evacuation, uses visual detection techniques (e.g., facial recognition) as people are leaving an environment to determine who has evacuated, and then contacts those individuals that did not evacuate (e.g., using text, email, call, a mass notification systems in the environment, etc.).

Figure 1:
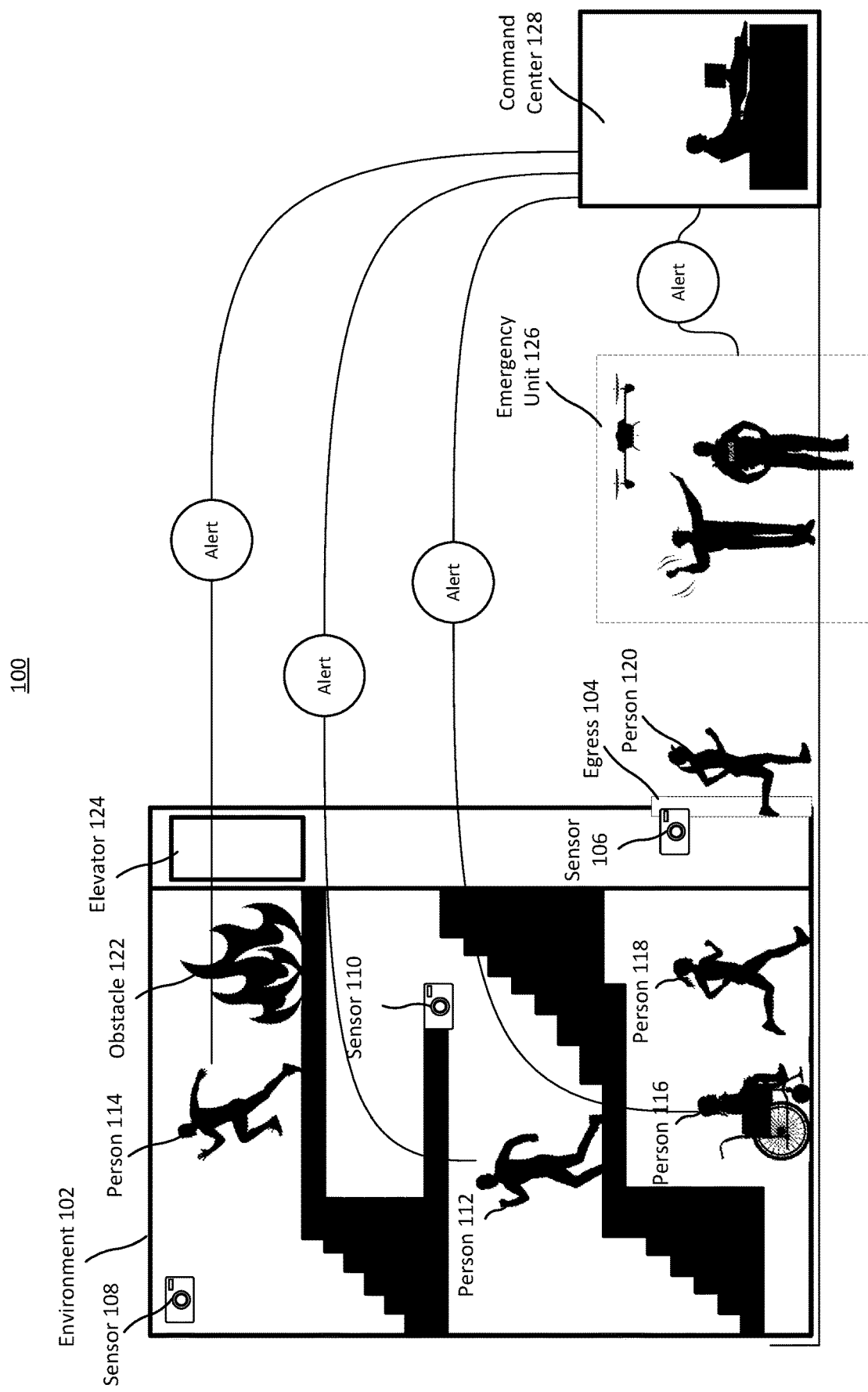
FIG. 1 is a diagram of a scenario for providing evacuation guidance, in accordance with exemplary aspects of the present disclosure.

FIG. 1 is a diagram 100 of a scenario for providing evacuation guidance, in accordance with exemplary aspects of the present disclosure. In the presented scenario, environment 102 (e.g., an apartment building, office, store, etc.) is to be evacuated and an evacuation guidance component (described in FIG. 3) is used to monitor and assist the persons (e.g., persons 112, 114, 116, 118, and 120) in environment 102. Distributed throughout environment 102 may be various sensors (e.g., sensors 106, 108, 110). For example, sensor 108 may be a security camera that monitors the hallway of the third floor of environment 102. Sensor 110 may be a security camera that monitors the hallway of the second floor of environment 102. Sensor 106 may be located near egress point 104 and may monitor the hallway of the first floor. During the evacuation, various events can take place that can impede a person from evacuating. For example, an obstacle 122 (e.g., a fire) may arise or an egress path may be eliminated (e.g., elevator 124 may be disabled).

An evacuation guidance component may be executed by a computing device that is in communication with the sensors 106, 108, and 110, and the devices of the persons in environment 102. The computing device may be located at environment 102 or at a remote location. The evacuation guidance component is configured to transmit personalized alerts to each person in environment 102 in order to guide them to egress point 104 (or any other egress points of an environment such as the closest available egress point). In some aspects, if a person does not have a device such that he/she may receive an alert, the evacuation guidance component may use alarms (e.g., a bell, a speaker, etc.) located in environment 102 or any public announcement/mass notification system available at environment 102.

Figure 2:
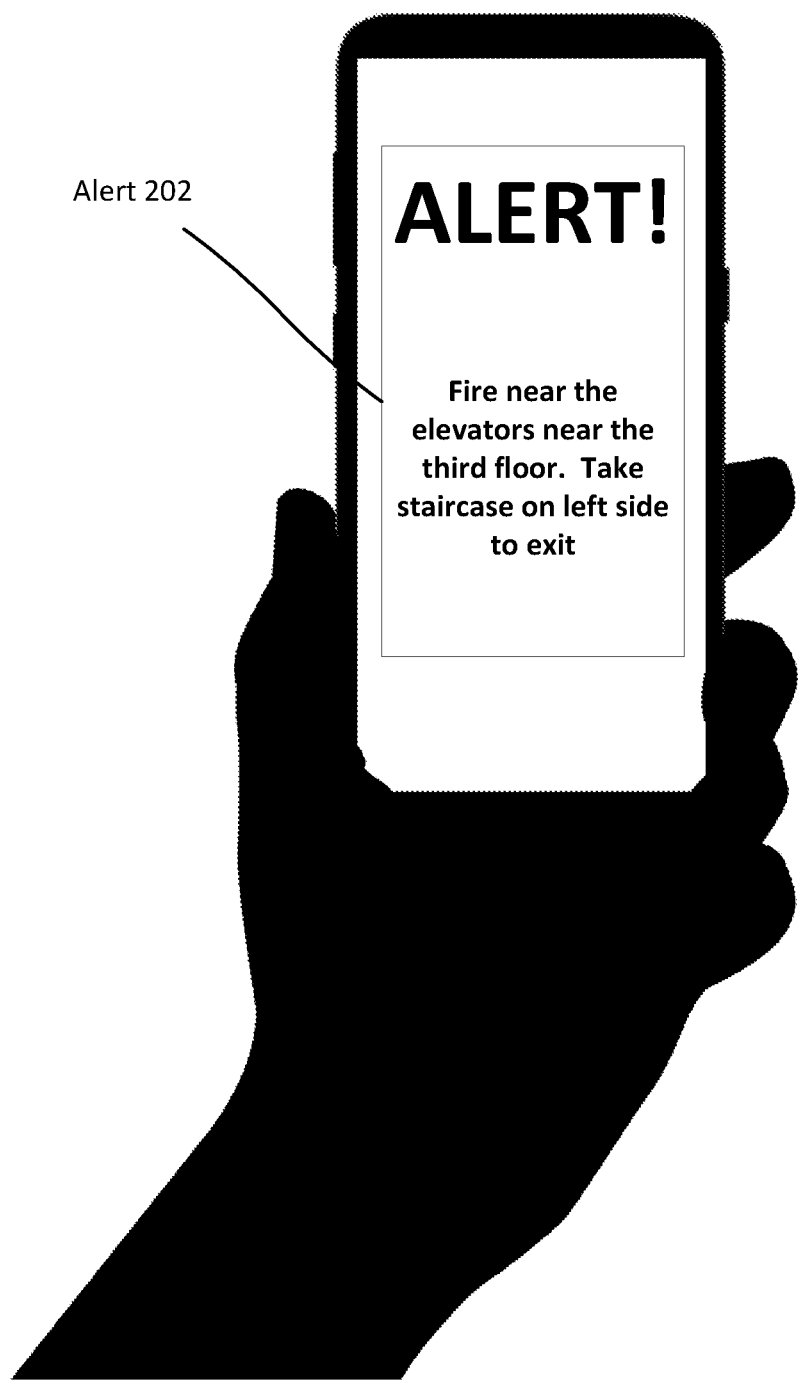
FIG. 2 is a diagram of an alert that is transmitted to a person, in accordance with exemplary aspects of the present disclosure.

FIG. 2 is a diagram 200 of an alert 202 that is transmitted to a person, in accordance with exemplary aspects of the present disclosure. In some aspects, the alert 202 comprises at least one of navigation instructions to evacuate the environment, information about an obstacle found in an exit path of the person, a request to confirm acknowledgment of the evacuation, a request to confirm physical wellbeing, or an option to contact emergency unit personnel. It should be noted that the alerts 202 are catered to each person's situation. The evacuation guidance component may evaluate, based on the last known location of a person, an egress path of a person, obstacles along the egress path, and physical restrictions of the person, what the contents of the alert should be. For example, the alert 202 in diagram 200 may be a text message sent to the smartphone of person 114 in response to determining that person 114 is on the third floor of environment 102 and obstacle 122 is on the third floor as well. Because person 112 is not located on the third floor and is heading to the first floor, the specific alert 202 shown in diagram 200 would not be presented to the person 112. Alert 202 may also be an image, a video clip, and audio clip, a vibration, or any combination thereof. In some aspects, the alert may include navigation instructions for the person to exit the environment. These navigation instructions may be sent in one alert as a summary, or in multiple alerts (in real-time) as single instructions depending on the location of the person.

Figure 3:
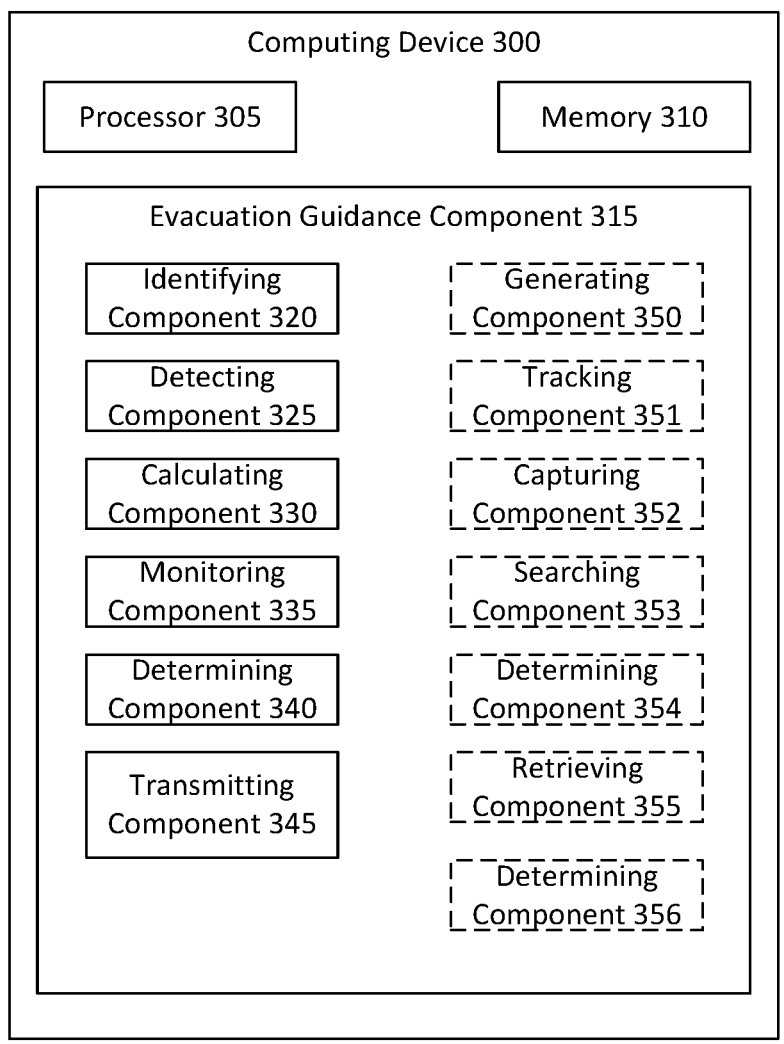
FIG. 3 is a block diagram of a computing device executing an evacuation guidance component, in accordance with exemplary aspects of the present disclosure.
Figure 4:
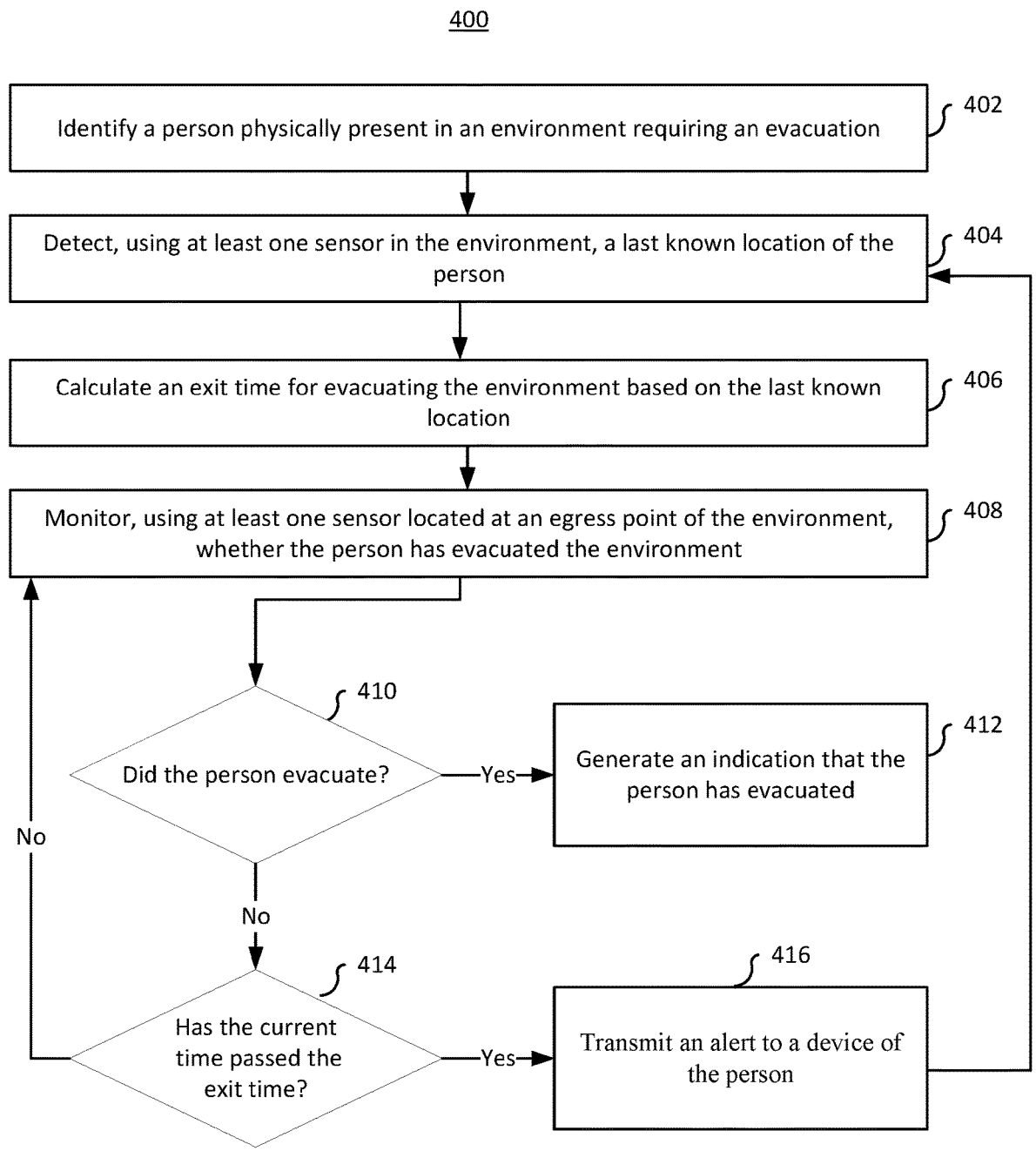
FIG. 4 is a flowchart illustrating a method of providing evacuation guidance, in accordance with exemplary aspects of the present disclosure.

FIG. 3 is a block diagram of computing device 300 executing an evacuation guidance component, in accordance with exemplary aspects of the present disclosure. FIG. 4 is a flowchart illustrating the method 400 of providing evacuation guidance, in accordance with exemplary aspects of the present disclosure. Referring to FIG. 3 and FIG. 4, in operation, computing device 300 may perform method 400 of providing evacuation guidance via execution of evacuation guidance component 315 by processor 305 and/or memory 310. Computing device 300 may be located in a remote command center 128 that is configured to communicate (e.g., via the Internet) with the devices of various persons, emergency unit personnel, and sensors in or near the environment.

At block 402, the method 400 includes identifying a person physically present in an environment requiring an evacuation. For example, in an aspect, computer device 300, processor 305, memory 310, evacuation guidance component 315, and/or identifying component 320 may be configured to or may comprise means for identifying person 112 physically present in environment 102 requiring an evacuation. For example, person 112 may be detected by sensor 110 (e.g., a camera). This is further described in method 600.

At block 404, the method 400 includes detecting, using at least one sensor in the environment, a last known location of the person. For example, in an aspect, computer device 300, processor 305, memory 310, evacuation guidance component 315, and/or detecting component 325 may be configured to or may comprise means for detecting, using sensor 110 in environment 102, a last known location of person 112.

In some aspects, the location of the sensor may provide the location of person 112. For example, when comparing all sensor data acquired by sensors 106, 108, and 110, evacuation guidance component 315 may determine that person 112 was most recently detected by sensor 110. In some aspects, the last known location may be identified using sensors such as cameras, physical badge readers, or logical access points.

Evacuation guidance component 315 may refer to a data structure in memory 310 that indicates the location of sensors in environment 102 and equate the location of the sensor to the location of the person. For example, the data structure may indicate that sensor 110 is on the second floor of environment 102 and therefore person 112 is also on the second floor. In some aspects, evacuation guidance component 315 may receive global-positioning-system (GPS) coordinates of the person from a device that the person is using (e.g., a smartphone listed as an emergency device) and set the last known location to the GPS coordinates.

At block 406, the method 400 includes calculating an exit time for evacuating the environment based on the last known location. For example, in an aspect, computer device 300, processor 305, memory 310, evacuation guidance component 315, and/or calculating component 330 may be configured to or may comprise means for calculating an exit time for evacuating environment 102 based on the last known location. The exit time may be a function of the distance between the last known location of the person and the egress point 104 and may factor in obstacles and their positions in environment 102 as well as physical restrictions of the person. Calculating the exit time is further described in method 700. Suppose that for person 112, the exit time is 3:00 pm.

At block 408, the method 400 includes monitoring, using at least one sensor located at an egress point of the environment, whether the person has evacuated the environment. For example, in an aspect, computer device 300, processor 305, memory 310, evacuation guidance component 315, and/or monitoring component 335 may be configured to or may comprise means for monitoring, using sensor 106 located at egress point 104 of environment 102, whether person 112 has evacuated environment 102.

At block 410, the method 400 includes determining whether the person evacuated. For example, in an aspect, computer device 300, processor 305, memory 310, evacuation guidance component 315, and/or determining component 340 may be configured to or may comprise means for determining whether person 112 evacuated. For example, evacuation guidance component 315 may determine whether person 112 was detected by sensor 106 (e.g., a security camera) and seen exiting environment 102. In response to determining that the person evacuated, method 400 advances to block 412. In response to determining that the person did not evacuate, method 400 advances block 414.

At block 412, the method 400 includes generating an indication that the person has evacuated. For example, in an aspect, computer device 300, processor 305, memory 310, evacuation guidance component 315, and/or generating component 350 may be configured to or may comprise means for generating an indication (e.g., an evacuation status discussed in FIG. 5) that person 112 has evacuated.

At block 414, the method 400 includes determining whether the current time has passed the exit time. For example, in an aspect, computer device 300, processor 305, memory 310, evacuation guidance component 315, and/or determining component 340 may be configured to or may comprise means for determining whether the current time has passed the exit time.

Suppose that the current time is 2:58 pm. In response to determining that the current time has not passed the exit time (e.g., 3:00 pm), method 400 returns to block 408 (i.e., monitoring component 335 continues to monitor evacuation status of person 112).

Suppose that the current time eventually reaches 3:01 pm. In response to determining that the current time has passed the exit time, method advances to block 416. At block 416, the method 400 includes transmitting an alert to a device of the person. For example, in an aspect, computer device 300, processor 305, memory 310, evacuation guidance component 315, and/or transmitting component 345 may be configured to or may comprise means for transmitting an alert to a device of person 112. From block 416, method 400 returns to block 404, where detecting component 325 updates the last known location of the person and proceeds through method 400 (e.g., calculate a new exit time based on updated information of person 112).

In some aspects, evacuation guidance component 315 maintains user profiles in memory 310. The user profile may be a data structure that includes information about a person such as their name, phone number, email, emergency contact, emergency device, etc. For example, the user profile may be generated by company, institution, owner, etc., of environment 102. In some aspects, the alert is sent as a text message (e.g., written) or a call (e.g., verbal) to the listed phone number on the user profile. In some aspects, the alert is sent as an email. In some aspects, the alert is transmitted as a notification on a listed emergency device (e.g., evacuation guidance component 315 may be installed as a thin client on the emergency device). In some aspects, the alert is sent to one or more of: the person, an emergency contact of the person (e.g., friend, relative, etc.), and emergency unit 126 (e.g., a firefighter, EMT, nurse, etc.). In some aspects, emergency unit 126 may comprise a robot vehicle (e.g., a drone) that is configured to navigate through the environment and monitor the person. The robot vehicle may be run by an A.I., that offers real-time instructions to help the person evacuate.

In some aspects, evacuation guidance component 315 transmits the alert periodically to monitor an evacuation status of a person. For example, evacuation guidance component 315 may transmit an alert every 20 seconds to check on the status of the person and motivate them to evacuate. Each alert may also contain updated information (e.g., new navigation instructions or safety information). In some aspects, alert transmission may increase in frequency based on the urgency of a situation (e.g., detecting that a fire is spreading). In some aspects, the intensity of an alert notification may increase as the number of alerts transmitted to a person increases. For example, evacuation guidance component 315 may include metadata in the alert indicative of how long a sound associated with the alert or a vibration should be played, how loud/strong, and the brightness level at which the alert should be displayed on the device of the person.

In some aspects, transmitting component 345 may include a confirmation request in the alert. In such case, if the person does not respond to the confirmation request for at least a threshold period of time (e.g., 1 minute), evacuation guidance component 315 may re-transmit an alert to the device. If transmitting component 345 does not receive a confirmation by the person to the subsequent alert(s), evacuation guidance component 315 may determine that the person cannot evacuate.

In some aspects, evacuation guidance component 315 determines whether a person can evacuate. For example, some persons may be trapped due to an obstacle or an injury. A person may fall or be unconscious. Accordingly, when evacuation guidance component 315 determines that a person cannot evacuate, evacuation guidance component 315 may transmit, via transmitting component 345, the last known location of the person and an identifier of the person to a device of emergency unit personnel (e.g., a computer of firefighters reporting to the environment).

In some aspects, evacuation guidance component 315 may determine that the person cannot evacuate the environment due to an obstacle using at least one sensor (e.g., a camera, a smoke alarm, a temperature sensor) in the environment. For example, evacuation guidance environment 315 may determine that obstacle 122 (e.g., a fire) is in the path of the person. In response to determining that the path is the sole path to reach the egress point, evacuation guidance component 315 may determine that the person cannot evacuate.

In some aspects, evacuation guidance component 315 may determine that the person cannot evacuate the environment due to a physical restriction (e.g., an injury or fall) based on a user profile of the person or at least one sensor in the environment. For example, evacuation guidance component 315 may determine that the person has fallen while navigating to the egress point. In response to determining that the person has not stood up and resumed evacuation towards the egress point for at least a threshold period of time (e.g., 30 seconds), evacuation guidance component 315 may determine that the person cannot evacuate.

In order to detect an obstacle or a physical restriction, evacuation guidance component 315 may utilize computer vision techniques and/or machine learning. For example, a combination of the sensors (e.g., cameras, temperature sensors, carbon monoxide detectors, etc.) in the environment may transmit sensor data to evacuation guidance component 315. Evacuation guidance component 315 may use object detection algorithms (e.g., classification) to detect fallen people (e.g., a machine learning algorithm may be trained to classify whether a person is in a fallen position) or obstacles (e.g., a machine learning algorithm may be trained to detect fires, smoke, water, exposed wires, debris, etc.) in an image and confirm the classification using sensor data (e.g., a fire may be detected in an image and a carbon monoxide alarm's data may confirm the presence of a fire).

In some aspects, subsequent to detecting an obstacle in a portion of an environment (e.g., a fire in a room), evacuation guidance component 315 may communicate with different sensors in the vicinity of the portion (e.g., smart locks, motion detecting sliding doors, etc.) to prevent access to the portion. Evacuation guidance component 315 may first determine whether preventing access to the portion (e.g., by locking the doors or deactivating the sliding doors) will prevent any person from evacuating the environment. For example, by locking a door to a room through which a person needs to pass through, the person may be stuck in the environment. Accordingly, evacuation guidance component 315 may only prevent access to the portion comprising the obstacle when doing so will not hinder any persons from escaping.

Figure 5:
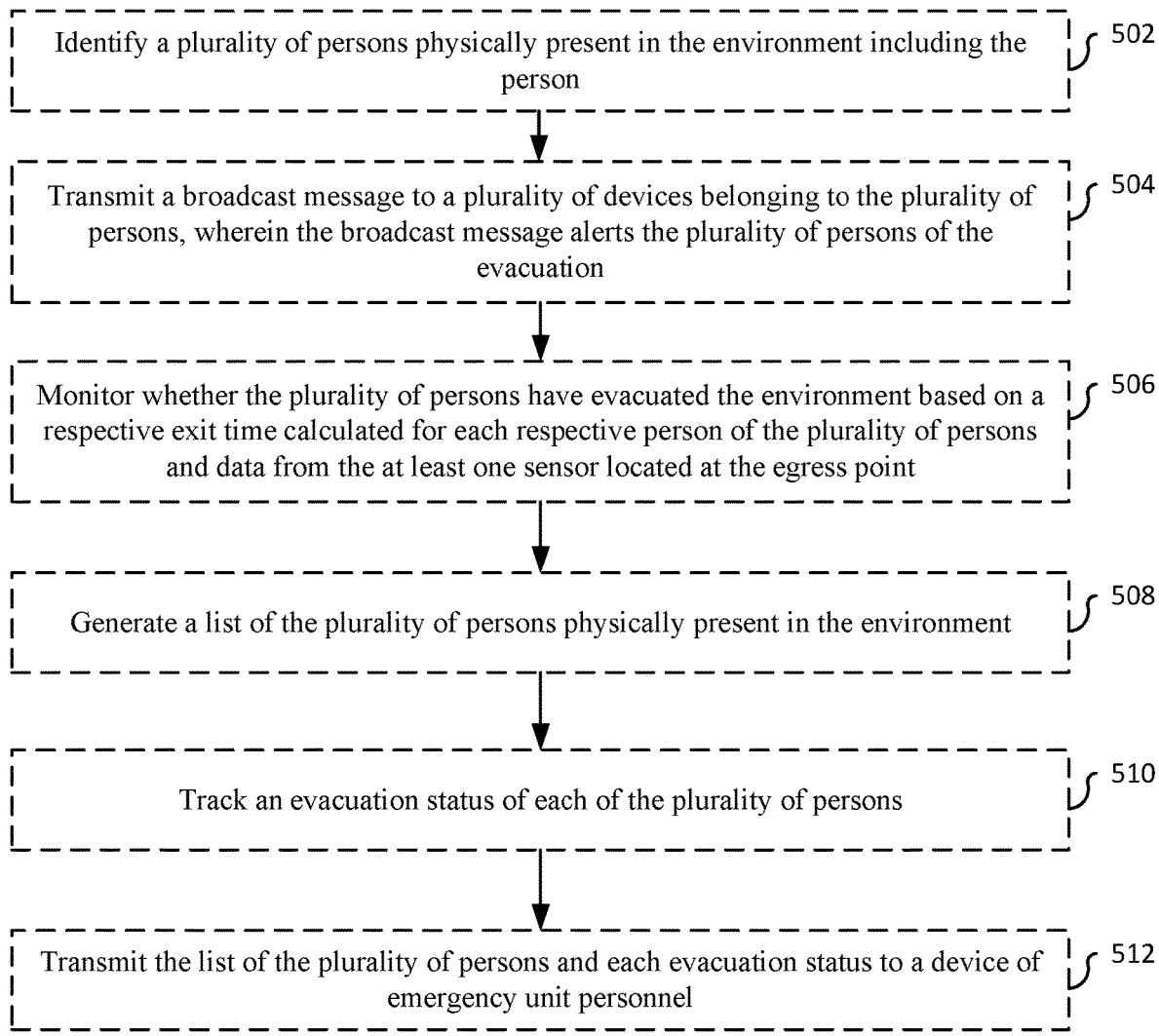
FIG. 5 is a flowchart illustrating a method of tracking the evacuation status of a plurality of persons, in accordance with exemplary aspects of the present disclosure.

FIG. 5 is a flowchart illustrating method 500 of tracking the evacuation status of a plurality of persons, in accordance with exemplary aspects of the present disclosure. In some aspects, evacuation guidance component 315 may execute method 500 when more than one person is identified at the environment. For each person identified, evacuation guidance component 315 may execute blocks of method 400.

At block 502, the method 500 includes identifying a plurality of persons physically present in the environment including the person. For example, in an aspect, computer device 300, processor 305, memory 310, evacuation guidance component 315, and/or identifying component 320 may be configured to or may comprise means for identifying persons 112, 114, 116, 118, and 120 physically present in environment 102 including person 112.

At block 504, the method 500 includes transmitting a broadcast message to a plurality of devices belonging to the plurality of persons, wherein the broadcast message alerts the plurality of persons of the evacuation. For example, in an aspect, computer device 300, processor 305, memory 310, evacuation guidance component 315, and/or transmitting component 345 may be configured to or may comprise means for transmitting a broadcast message to a plurality of devices belonging to persons 112, 114, 116, 118, and 120, wherein the broadcast message alerts persons 112, 114, 116, 118, and 120 of the evacuation. For example, the broadcast message may be a text stating "Fire Detected—Evacuate the premises and stand at a safe location!" In some aspects, evacuation guidance component 315 may also utilize any alarms or mass communication system (e.g., intercoms, speakers, monitors, etc.) present at the environment to alert the plurality of persons.

At block 506, the method 500 includes monitoring whether the plurality of persons have evacuated the environment based on a respective exit time calculated for each respective person of the plurality of persons and data from the at least one sensor located at the egress point. For example, in an aspect, computer device 300, processor 305, memory 310, evacuation guidance component 315, and/or monitoring component 335 may be configured to or may comprise means for monitoring whether persons 112, 114, 116, 118, and 120 have evacuated environment 102 based on a respective exit time calculated for each respective person of persons 112, 114, 116, 118, and 120 and data from sensor 106 located at egress point 104. At block 506, evacuation guidance component 315 may execute blocks 404 to 416 of method 400.

At block 508, the method 500 includes generating a list of the plurality of persons physically present in the environment. For example, in an aspect, computer device 300, processor 305, memory 310, evacuation guidance component 315, and/or generating component 350 may be configured to or may comprise means for generating a list of the plurality of persons physically present in environment 102.

At block 510, the method 500 includes tracking an evacuation status of each of the plurality of persons. For example, in an aspect, computer device 300, processor 305, memory 310, evacuation guidance component 315, and/or tracking component 351 may be configured to or may comprise means for tracking an evacuation status of persons 112, 114, 116, 118, and 120.

In some aspects, the evacuation status is a binary representation of whether a person has evacuated or not. For example, as shown in FIG. 1, the evacuation status of person 120 may be "evacuated," whereas for every other person, the evacuation status may be "not evacuated." In some aspects, the evacuation status further includes one or more of a calculated exit time for a given person, an actual exit time for the given person, and a last known location of the given person in the environment.

At block 512, the method 500 includes transmitting the list of the plurality of persons and each evacuation status to a device of emergency unit personnel. For example, in an aspect, computer device 300, processor 305, memory 310, evacuation guidance component 315, and/or transmitting component 345 may be configured to or may comprise means for transmitting the list of persons 112, 114, 116, 118, and 120 and each evacuation status to a device of emergency unit personnel. This notifies the emergency unit personnel of who is still in the environment, when they are expected to exit, whether they need assistance, and their last known location.

Figure 6:
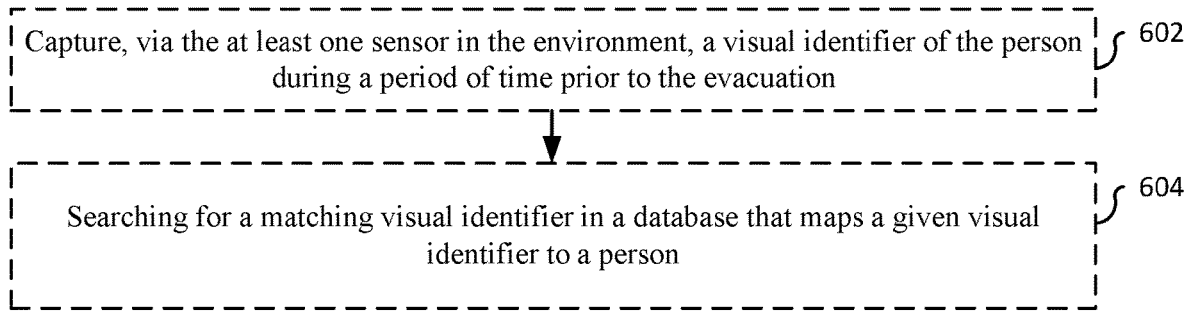
FIG. 6 is a flowchart illustrating a method of identifying the person in the environment, in accordance with exemplary aspects of the present disclosure.

FIG. 6 is a flowchart illustrating method 600 of identifying the person in the environment, in accordance with exemplary aspects of the present disclosure. In some aspects, evacuation guidance component 315 may execute method 600 at block 402 of method 400.

At block 602, the method 600 includes capturing, via the at least one sensor in the environment, a visual identifier of the person during a period of time prior to the evacuation. For example, in an aspect, computer device 300, processor 305, memory 310, evacuation guidance component 315, and/or capturing component 352 may be configured to or may comprise means for capturing, via the at least one sensor in the environment, a visual identifier of person 112 during a period of time prior to the evacuation (i.e., before the evacuation was issued). In some aspects, the visual identifier is an image depicting at least one of: a face, a clothing item, a badge, a barcode, a logo, or a fingerprint.

The at least one sensor in some aspects may include a camera that uses facial recognition or outfit recognition to identify a person. In some aspects, the sensor may include a biometrics scanner or an ID badge scanner. For example, person 112 may have scanned his/her fingerprint or ID badge to gain access to environment 102 prior to the evacuation. In some aspects, evacuation guidance component 315 may track who has entered an environment and who has left using said sensors and generate, for storage in memory 310, a record of attendance in the environment (e.g., a data structure with identifiers of persons and their associated entry/exit timestamps). When an evacuation is set to happen, evacuation guidance component 315 may identify a plurality of persons based on the record of attendance.

At block 604, the method 600 includes searching for a matching visual identifier in a database that maps a given visual identifier to a person. For example, in an aspect, computer device 300, processor 305, memory 310, evacuation guidance component 315, and/or searching component 353 may be configured to or may comprise means for searching for a matching visual identifier in a database that maps a given visual identifier (e.g., a face) to a person (e.g., a name).

In order to track who is in environment 102 and who has exited, evacuation guidance component 315 utilizes at least the sensor 106 near the egress point 104. For example, evacuation guidance component 315 may use facial recognition to identify a person and mark them as having left environment 102. Identification, when performed by comparing against a database of images, may be slow depending on the size of a database. For example, if a database is generated for a stadium evacuation containing more than 50,000 entries, identification may need to be sped up, especially during a crucial situation such as an evacuation. Accordingly, in some aspects, when evacuation guidance component 315 determines that the size of the database is larger than a threshold size (e.g., 10,000), evacuation guidance component 315 may update the comparison pool in the database by not comparing a candidate visual identifier that needs to be identified with visual identifiers associated with persons who have evacuated already or were not in the environment when the evacuation was initiated.

Figure 7:
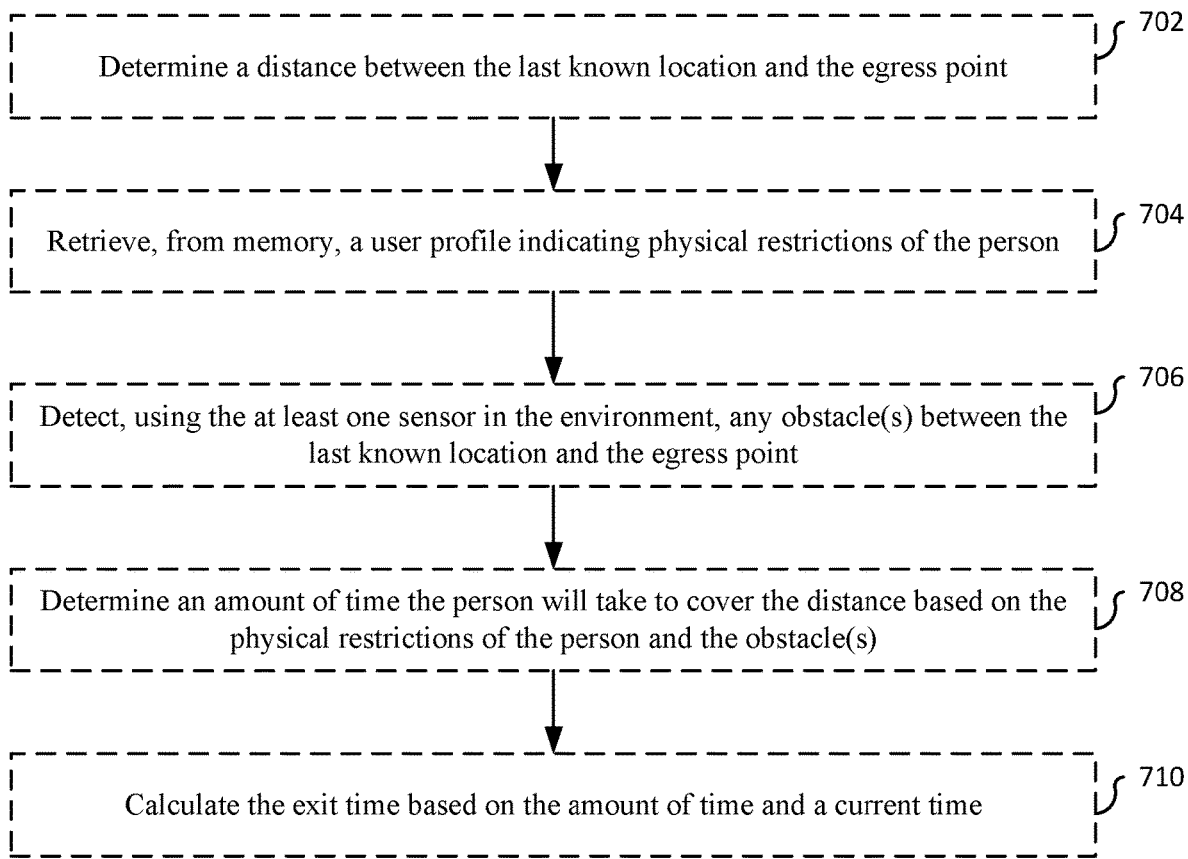
FIG. 7 is a flowchart illustrating a method of calculating an exit time of a person, in accordance with exemplary aspects of the present disclosure.

FIG. 7 is a flowchart illustrating method 700 of calculating an exit time of a person, in accordance with exemplary aspects of the present disclosure. In some aspects, evacuation guidance component 315 may execute method 700 at block 406 of method 400.

At block 702, the method 700 includes determining a distance between the last known location and the egress point. For example, in an aspect, computer device 300, processor 305, memory 310, evacuation guidance component 315, and/or determining component 354 may be configured to or may comprise means for determining a distance between the last known location and the egress point. Suppose that environment 102 is a college campus and that the person being monitored is person 116. The last known location of person 116 may be described using GPS coordinates. Accordingly, evacuation guidance component 315 may determine the distance based on the difference between the GPS coordinates of person 116 and the GPS coordinates of egress point 104.

In other aspects, evacuation guidance component 315 may approximate distances using a data structure comprising dimensions of rooms, zones, hallways, etc., in environment 102. For example, the last known location of person 116 may be on the first floor. Evacuation guidance component 315 may refer to the dimensions to determine the size of the first floor (particularly between where the location the person 116 stands and egress point 104).

At block 704, the method 700 includes retrieving, from memory, a user profile indicating physical restrictions of the person. For example, in an aspect, computer device 300, processor 305, memory 310, evacuation guidance component 315, and/or retrieving component 355 may be configured to or may comprise means for retrieving, from memory 310, a user profile indicating physical restrictions of the person. As discussed before, evacuation guidance component 315 may track user profiles of occupants of environment 102. The user profile may list restrictions such as disabilities or medical conditions. For example, person 116 may be restricted to a wheelchair.

At block 706, the method 700 includes detecting, using the at least one sensor in the environment, any obstacle(s) between the last known location and the egress point. For example, in an aspect, computer device 300, processor 305, memory 310, evacuation guidance component 315, and/or determining component 356 may be configured to or may comprise means for detecting, using the at least one sensor in the environment, any obstacle(s) between the last known location and the egress point. As discussed previously, evacuation guidance component 315 may detect obstacles and determine the location of the obstacles (as it would determine the location of a person).

At block 708, the method 700 includes determining an amount of time the person will take to cover the distance based on the physical restrictions of the person and the obstacle(s). For example, in an aspect, computer device 300, processor 305, memory 310, evacuation guidance component 315, and/or determining component 356 may be configured to or may comprise means for determining an amount of time the person will take to cover the distance based on the physical restrictions of the person and the obstacle(s).

For example, if the distance between the last known location and the egress point 104 is 300 feet and person 116 is moving 3 feet per second (determined by evacuation guidance component 315 by comparing consecutively taken last known locations and their associated timestamps or set to a predetermined average speed), the amount of time will be 100 seconds (i.e., 1 minute, 40 seconds). In some aspects, this distance is associated with the shortest route to the egress point.

If an obstacle is detected in between the last known location of the person and the egress point, a delay is added to the amount of time. Depending on the obstacle, evacuation guidance component 315 may recalculate the distance along a new route to egress point 104 or slow down the speed of movement (e.g., from 3 feet/s to 1.5 feet/s for someone who is elderly or is a toddler). Likewise, based on the physical restrictions, evacuation guidance component 315 may suggest a new route (e.g., a ramp for someone in a wheelchair) and may account for that particular route when calculating time. Evacuation guidance component 315 may refer to a data structure that includes delay times for specific cases (e.g., add 20 seconds if debris is partially blocking a path).

At block 710, the method 700 includes calculating the exit time based on the amount of time and a current time. For example, in an aspect, computer device 300, processor 305, memory 310, evacuation guidance component 315, and/or calculating component 330 may be configured to or may comprise means for calculating the exit time based on the amount of time and a current time. For example, if the amount of time is 2 minutes and the current time is 2:58 pm, the exit time will be 3:00 pm.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing evacuation guidance, comprising:
    identifying a person physically present in an environment requiring an evacuation;
    detecting, using at least one sensor in the environment, a last known location of the person;
    calculating an exit time for evacuating the environment based on an amount of time needed by the person to exit the environment starting from the last known location;
    monitoring, using at least one sensor located at an egress point of the environment, whether the person has evacuated the environment;
    determining whether a current time has passed the exit time; and
    transmitting an alert to a device of the respective person in response to determining that the current time has passed the exit time and that the person has not evacuated the environment.

2. The method of claim 1, further comprising:
    identifying a plurality of persons physically present in the environment including the person;
    transmitting a broadcast message to a plurality of devices belonging to the plurality of persons, wherein the broadcast message alerts the plurality of persons of the evacuation; and
    monitoring whether the plurality of persons have evacuated the environment based on a respective exit time calculated for each respective person of the plurality of persons and data from the at least one sensor located at the egress point.

3. The method of claim 2, further comprising:
    generating a list of the plurality of persons physically present in the environment; and
    tracking an evacuation status of each of the plurality of persons, wherein the evacuation status comprises at least one of: an indication of whether a given person evacuated, a calculated exit time for the given person, an actual exit time for the given person, and a last known location of the given person in the environment.

4. The method of claim 3, further comprising:
    transmitting the list of the plurality of persons and each evacuation status to a device of emergency unit personnel.

5. The method of claim 1, wherein identifying the person physically present in the environment further comprises:
    capturing, via the at least one sensor in the environment, a visual identifier of the person during a period of time prior to the evacuation; and
    searching for a matching visual identifier in a database that maps a given visual identifier to a person.

6. The method of claim 5, wherein the visual identifier is an image depicting at least one of: a face, a clothing item, a badge, a barcode, or a logo.

7. The method of claim 1, wherein the alert comprises at least one of:
    navigation instructions to evacuate the environment,
    information about an obstacle found in an exit path of the person,
    a request to confirm acknowledgment of the evacuation,
    a request to confirm physical wellbeing, or
    an option to contact emergency unit personnel.

8. The method of claim 1, wherein calculating the exit time for evacuating the environment based on the last known location further comprises:
    determining a distance between the last known location and the egress point;
    retrieving, from memory, a user profile indicating physical restrictions of the person;
    determining an amount of time the person will take to cover the distance based on the physical restrictions of the person; and
    calculating the exit time based on the amount of time and a current time.

9. The method of claim 8, further comprising:
    detecting, using the at least one sensor in the environment, an obstacle between the last known location and the egress point; and
    determining the amount of time the person will take to cover the distance based on the physical restrictions of the person and the detected obstacle.

10. The method of claim 1, further comprising:
    determining, using the at least one sensor in the environment, that the person cannot evacuate the environment; and
    transmitting the last known location of the person and an identifier of the person to a device of emergency unit personnel.

11. The method of claim 1, wherein the alert is transmitted periodically to monitor an evacuation status of the person.

12. An apparatus for providing evacuation guidance, comprising:
    a memory; and
    a processor communicatively coupled with the memory and configured to:
    identify a person physically present in an environment requiring an evacuation;
    detect, using at least one sensor in the environment, a last known location of the person;
    calculate an exit time for evacuating the environment based on an amount of time needed by the person to exit the environment starting from the last known location;

monitor, using at least one sensor located at an egress point of the environment, whether the person has evacuated the environment;

determine whether a current time has passed the exit time; and transmit an alert to a device of the person in response to determining that the current time has passed the exit time and that the person has not evacuated the environment.

13. The apparatus of claim 12, wherein the processor is further configured to:

identify a plurality of persons physically present in the environment including the person;

transmit a broadcast message to a plurality of devices belonging to the plurality of persons, wherein the broadcast message alerts the plurality of persons of the evacuation; and monitor whether the plurality of persons have evacuated the environment based on a respective exit time calculated for each respective person of the plurality of persons and data from the at least one sensor located at the egress point.

14. The apparatus of claim 13, wherein the processor is further configured to:

generate a list of the plurality of persons physically present in the environment; and track an evacuation status of each of the plurality of persons, wherein the evacuation status comprises at least one of: an indication of whether a given person evacuated, a calculated exit time for the given person, an actual exit time for the given person, and a last known location of the given person in the environment.

15. The apparatus of claim 14, wherein the processor is further configured to:

transmit the list of the plurality of persons and each evacuation status to a device of emergency unit personnel.

16. The apparatus of claim 12, wherein the processor is further configured to identify the person physically present in the environment by:

capturing, via the at least one sensor in the environment, a visual identifier of the person during a period of time prior to the evacuation; and searching for a matching visual identifier in a database that maps a given visual identifier to a person.

17. The apparatus of claim 16, wherein the visual identifier is an image depicting at least one of: a face, a clothing item, a badge, a barcode, or a logo.

18. The apparatus of claim 12, wherein the alert comprises at least one of:

navigation instructions to evacuate the environment, information about an obstacle found in an exit path of the person, a request to confirm acknowledgment of the evacuation, a request to confirm physical wellbeing, or an option to contact emergency unit personnel.

19. The apparatus of claim 12, wherein the processor is further configured to calculate the exit time for evacuating the environment based on the last known location by:

determining a distance between the last known location and the egress point;

retrieving, from memory, a user profile indicating physical restrictions of the person;

determining an amount of time the person will take to cover the distance based on the physical restrictions of the person; and calculating the exit time based on the amount of time and a current time.

20. A non-transitory computer-readable medium storing instructions for providing evacuation guidance, executable by a processor to:

identify a person physically present in an environment requiring an evacuation;

detect, using at least one sensor in the environment, a last known location of the person;

calculate an exit time for evacuating the environment based on an amount of time needed by the person to exit the environment starting from the last known location;

monitor, using at least one sensor located at an egress point of the environment, whether the person has evacuated the environment;

determine whether a current time has passed the exit time; and transmit an alert to a device of the respective person in response to determining that the current time has passed the exit time and that the person has not evacuated the environment.

* * * * *